(12) United States Patent
Daiku

(10) Patent No.: US 7,623,189 B2
(45) Date of Patent: Nov. 24, 2009

(54) STEREOSCOPIC IMAGE DISPLAY DEVICE COMPRISING TRANSMISSIVE LIQUID CRYSTAL DISPLAY ELEMENT

(75) Inventor: Yasuhiro Daiku, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 416 days.

(21) Appl. No.: 11/137,226

(22) Filed: May 24, 2005

(65) Prior Publication Data

US 2005/0264727 A1 Dec. 1, 2005

(30) Foreign Application Priority Data

May 26, 2004 (JP) ............................. 2004-155876

(51) Int. Cl.
*G02F 1/1335* (2006.01)
*G03B 21/00* (2006.01)
*G02B 27/22* (2006.01)

(52) U.S. Cl. .................... 349/15; 349/5; 349/7; 353/7; 359/462

(58) Field of Classification Search ...................... 349/5, 349/15, 63; 353/7; 359/462
See application file for complete search history.

(56) References Cited

U.S. PATENT DOCUMENTS

| | | | | |
|---|---|---|---|---|
| 3,248,165 A | | 4/1966 | Marks et al. | |
| 3,888,564 A | * | 6/1975 | Lebow | 359/472 |
| 4,647,966 A | * | 3/1987 | Phillips et al. | 348/58 |
| 5,235,444 A | * | 8/1993 | de Vaan | 349/9 |
| 5,467,205 A | * | 11/1995 | Kuba et al. | 349/5 |
| 5,712,732 A | * | 1/1998 | Street | 359/630 |
| 6,653,989 B2 | | 11/2003 | Nakanishi | |
| 7,027,113 B2 | * | 4/2006 | Kim et al. | 349/63 |
| 2005/0264882 A1 | | 12/2005 | Daiku | |

FOREIGN PATENT DOCUMENTS

| | | |
|---|---|---|
| JP | 3-119889 A | 5/1991 |
| JP | 7-5455 A | 1/1995 |
| JP | 10-268230 A | 10/1998 |

OTHER PUBLICATIONS

Related U.S. Appl. No. 11/137,227, filed May 24, 2005; Inventor: Yasuhiro Daiku; Title: Display Device for Displaying Three-Dimensional Image.

* cited by examiner

*Primary Examiner*—Michael H Caley
(74) *Attorney, Agent, or Firm*—Frishauf, Holtz, Goodman & Chick, P.C.

(57) ABSTRACT

A display device includes an image display unit having one surface and the other surface on which first and second images are respectively displayed. A first optical system leads a first image light displayed on the one surface of the image display unit. A second optical system leads a second image light displayed on the other surface of the image display unit. An image combining element combines the first and second image lights lead by the first optical system and the second optical system to form one image.

27 Claims, 8 Drawing Sheets

STEREOSCOPIC IMAGE DISPLAY DEVICE COMPRISING TRANSMISSIVE LIQUID CRYSTAL DISPLAY ELEMENT

CROSS-REFERENCE TO RELATED APPLICATIONS

This application is based upon and claims the benefit of priority from prior Japanese Patent Application No. 2004-155876, filed May 26, 2004, the entire contents of which are incorporated herein by reference.

BACKGROUND OF THE INVENTION

1. Field of the Invention

The present invention relates to a liquid crystal display device which displays a three-dimensional image 2. Description of the Related Art As liquid crystal display devices which display a three-dimensional image, there is conventionally a liquid crystal display device which displays an image for a right eye by using pixels provided every other column in a liquid crystal display element and an image for a left eye by using pixels provided every other remaining column and allows observation of the image for a right eye and the image for a left eye with respect to a right eye and a left eye of an observer using a lenticular lens which allocates lights emitted from the pixels in one row of the liquid crystal display element and lights emitted from the pixels in the other row in a direction of the right eye and a direction of the left eye of the display observer or a parallax barrier in which a plurality of light transmission sections and light prevention sections parallel to the pixel rows in the liquid crystal display element are alternately aligned in a stripe form (Jpn. Pat. Appln. KOKAI Publication No. 3-119889, Jpn. Pat. Appln. KOKAI Publication No. 7-005455, Jpn. Pat. Appln. KOKAI Publication No. 10-268230).

In the above-described conventional liquid crystal display device, a dot pitch of images for both right and left eyes is as rough as twofold of a pixel pitch of the liquid crystal display element in order to display an image for a right eye by using the pixels provided every other column in the liquid crystal display element and display an image for a left eye by using the pixels provided every other remaining column, and hence a three-dimensional image with a high resolution cannot be displayed.

Further, in the conventional liquid crystal display device, the lenticular lens having a lens pitch corresponding to the pixel pitch of the liquid crystal display element or the parallax barrier having a transmission section pitch corresponding to the pixel pitch must be arranged in such a manner that each lens section or the transmission section must be arranged in a predetermined angular relationship with respect to the pixels in each row in the liquid crystal display element, and hence production is difficult.

BRIEF SUMMARY OF THE INVENTION

It is an object of the present invention to provide a liquid crystal display device which can display a three-dimensional image with a high resolution and can be readily manufactured.

According to a first aspect of the present invention, there is provided a display device comprising:

an image display unit having one surface and the other surface on which first and second images are respectively displayed;

a first optical system which leads a first image light displayed on the one surface of the image display unit;

a second optical system which leads a second image light displayed on the other surface of the image display unit; and an image combining element which combines the first and second image lights lead by the first optical system and the second optical system to form one image.

This display device displays first and second images on both surfaces of the image display unit, leads these two image lights to an image combining element by using the first optical system and the second optical system, and forms one three-dimensional image by using this image combining element.

In this display device, the image display unit may include a light transmission type display element which controls transmission of a light to display an image, and two surface light sources which are arranged on both sides of this display element, irradiate the display element with illumination lights and transmit a light exiting from the display element therethrough. It is preferable for this light transmission type display element to be formed as a liquid crystal display element including a liquid crystal panel having a pair of substrates having at least one electrode formed on opposing surfaces thereof, and a liquid crystal layer provided between the pair of substrates, and two polarizing plates arranged with this liquid crystal panel therebetween.

In this display device, preferably, the first optical system includes a first reflection element which reflects a first image light displayed on one surface of the image display unit and allows this light to fall on the image combining element from an observation-side surface thereof, and the second optical system includes a second reflection element which reflects a second image light displayed on the other surface of the image display unit and allows this light to enter the image combining element from a surface thereof on a side opposite to the observation side. It is desirable that the image display unit allows the first image light including a first linearly polarized light and the second image light including a second linearly polarized light, the first and second linearly polarized lights having first and second polarization planes orthogonal to each other to exit from respective surfaces, and that the image combining element includes a reflection polarizing plate which has a transmission axis and a reflection axis in two directions orthogonal to each other on a plane parallel to a plate surface, has optical characteristics of transmitting a linearly polarized light component parallel to the transmission axis and reflecting a linearly polarized light component parallel to the reflection axis in regard to two linearly polarized light components orthogonal to each other in an incident light and reflects the incident first image light from the first optical system and transmits the incident second image light from the second optical system therethrough, or a half mirror which reflects the incident first image light from the first optical system and transmits the incident second image light from the second optical system therethrough.

In this case, the image combining element is aligned in parallel with the image display unit on a side in the lateral direction as seen from the observation side or arranged at a lower side in the vertical direction as seen from the observation side, the first optical system can include a first reflection element which is arranged on the observation side of the image display unit and the image combining elements, reflects the first image light displayed on the one surface of the image display unit and allows this light to fall on the image combining element from its surface on the observation side, and the second optical system can include a second reflection element which is arranged on a rear surface side opposite to the observation side of the image display unit and the image combining element, reflects the second image light displayed on the other surface of the image display unit and allows this light to enter the image combining element from its rear surface side.

In this display device, preferably, the image display unit displays first and second images having different brightness levels on one surface and the other surface thereof, the image combining element combines the first and second images to form a three-dimensional image or displays two first and second images including an image for a right eye and an image for a left eye on one surface and the other surface thereof, and the image combining element allows the image for a right eye of the first and second images in a direction of a right eye of an observer and the image for a left eye to exit in a direction of a left eye of the observer, respectively, to form a three-dimensional image.

In this case, the image combining element is arranged in parallel with the image display unit on the side in a lateral direction as seen from the observer side, the first optical system includes a first reflection element which is arranged on the observation side of the image display unit and the image combining element, reflects the first image light displayed on the one surface of the image display unit and allows this light to fall on the image combining element from its surface on the observation side, the second optical system includes a second reflection element which is arranged on a rear surface side opposite to the observation side of the image combining element, reflects the second image light displayed on the other surface of the image display unit and allows this light to enter the image combining element from its rear surface side, and at least one of the first optical system and the second optical system may be arranged at a slant with respect to the image display unit and the image combining element. Alternatively, the first optical system includes a first reflection element which is arranged in substantially parallel with the image display unit on the observation side of the image display unit and the image combining element, reflects the first image light displayed on the one surface of the image display unit and allows this light to fall on the image combining element from its surface on the observation side, the second optical system includes a second reflection element which is arranged in substantially parallel with the image display unit on a rear surface side opposite to the observation side of the image display unit and the image combining element, reflects the second image light displayed on the other surface of the image display unit and allows this light to enter the image combining element from its rear surface side thereof, and the image combining element may be arranged at a slant with respect to the image display unit on a side in the lateral direction as seen from the observation side.

According to a second aspect of the present invention, there is provided a display device comprising:

an image display element which controls transmission of a light to display an image;

two surface light sources which are respectively arranged on both sides of the image display element, irradiate the display element with illumination lights on the both sides, and transmit lights exiting from the image display element therethrough;

a first optical system which leads a light of an image displayed on one surface of the image display element;

a second optical system which leads a light of an image displayed on the other surface of the image display element;

an image combining element which combines the two images led by the first optical system and the second optical system to form one image;

a display drive circuit which drives the image display element to display at least two different sub-images constituting one image; and a light source control circuit which controls lighting of the two surface light sources in accordance with display of the sub-images of the image unit.

In this display device, it is preferable that the display drive circuit displays two sub-images which are substantially the same images with different brightness levels in the image display element, the light source control circuit alternately turns on the two surface light sources arranged on both sides of the image display element in accordance with display of the two sub-images so that sub-image lights of the respective two sub-images are allowed to alternately exit to the both surfaces of the image display element, and the image combining element combines the two sub-images to form a three-dimensional image. Further, the display drive circuit may alternately display two sub-images including an image for a right eye and an image for a left eye in the image display element, the light source control circuit may alternately turn on the two surface light sources arranged on both sides of the image display elements in accordance with display of the two sub-images so that sub-image lights of the respective two sub-images are allowed to alternately exit to the both surfaces of the image display element, and the image combining element may allow an image for a right eye and an image for a left eye in the first and second images to exit in different directions, i.e., a direction of a right eye of an observer and a direction of a left eye of the observer, thereby forming a three-dimensional image.

In this case, it is desirable that the first optical system includes a first reflection element which reflects the first sub-image light displayed on one surface of the image display element and allows this light to fall on the image combining element from its surface on the observation side, and the second optical system includes a second reflection element which reflects the second sub-image displayed on the other surface of the image display unit and allows this light to enter the image combining element from its surface opposite to the observation side. Furthermore, it is preferable that the image display element allows a first sub-image light including a linearly polarized light and a second sub-image light including a linearly polarized light of a polarization plane substantially orthogonal to a polarization plane of the first sub-image light to exit, and the image combining element includes a reflection polarizing plate which has a transmission axis and a reflection axis in two directions orthogonal to each other on a plane parallel to the plate surface, has optical characteristics of transmitting a linearly polarized light component parallel to the transmission axis and reflecting a linearly polarized light component parallel to the reflection axis in regard to two linearly polarized light components orthogonal to each other in an incident light, reflects an incident first sub-image light from the first optical system and transmits an incident second sub-image from the second optical system. Moreover, it is preferable that the image combining element is arranged in parallel with the image display element on a side in the lateral direction as seen from the observation side, the first optical system includes a first reflection element which is arranged on the observation side of the image display unit and the image combining element, reflects a first image light displayed on the one surface of the image display unit and allows this light to fall on the image combining element from its surface on the observation side, and the second optical system includes a second reflection element which is arranged on a rear surface side opposite to the observation side of the image display unit and the image combining element, reflects a second image light displayed on the other surface of the image display unit and allows this light to enter the image combining element from its rear surface side.

According to a third aspect of the present invention, there is provided a display device comprising:

image displaying means for displaying two different sub-images constituting one image on one surface and the other surface thereof;

two surface light source means which are arranged on both sides of the image displaying means, irradiate the image displaying means with illumination lights and transmit lights exiting from the image displaying means therebetween;

first optical means for leading a light of one sub-image displayed on one surface of the image displaying means;

second optical means for leading a light of the other sub-image displayed on the other surface of the image displaying means;

image combining means for combining the two sub-images led by the first optical means and the second optical means to form one image;

display driving means for driving the image displaying means to display at least two different sub-images constituting one image on one surface and the other surface of the image displaying means; and light source controlling means for controlling lighting of the two surface light source means in accordance with display of the sub-images by the image displaying means.

In this display device, it is preferable that the image displaying means allows a first sub-image light including a first linearly polarized light and a second sub-image light including a second linearly polarized light, the first and second linearly polarized lights having first and second polarization planes orthogonal to each other to alternately exit from one surface and the other surface thereof, the first optical means includes first reflecting means which is arranged on an observation side of the image displaying means and the image combining means, reflects the first sub-image light exiting from one surface of the image displaying means and allows this light to fall on the image combining means from its surface on the observation side, the second optical means includes second reflecting means which is arranged on a rear surface side opposite to the observation side of the image displaying means and the image combining means, reflects the second sub-image light displayed on the other surface of the image displaying means and allows this light to enter the image combining means from its rear surface side, and the image combining means is arranged in parallel with the image displaying means on a side in a lateral direction as seen from the observation side and includes a reflection polarizing plate which has a transmission axis and a reflection axis in two directions orthogonal to each other on a plane parallel to a plate surface, has optical characteristics of transmitting a linearly polarized light component parallel to the transmission axis and reflecting a linearly polarized light component parallel to the reflection axis in regard to two linearly polarized light components orthogonal to each other in an incident light, reflects the incident first sub-image light from the first optical means and transmits the incident second sub-image light from the second optical means therethrough.

In this liquid crystal display device according to the present invention, since the first and second images are displayed on the both surfaces of the image display unit, these two image lights are led to the image combining element by using the first optical system and the second optical system and this image combining element combines these lights to form one three-dimensional image, the precise first and the second images having the same dot pitch as a pixel pitch of the liquid crystal display element can be displayed in the image display unit, thereby displaying a three-dimensional image with a high resolution.

Moreover, since this liquid crystal display device includes an image display unit having a simple structure in which a pair of surface light sources are arranged on one surface and the other surface of a liquid crystal display element, the pair of surface light sources irradiating the liquid crystal display element with illumination lights from surfaces facing the liquid crystal display element, transmitting a light exiting from the liquid crystal display element therebetween and allowing this light to exit from surfaces opposite to the liquid display element side; an image combining element including a reflection polarizing plate which has a transmission axis and a reflection axis in two directions orthogonal to each other on a plane parallel to a plate surface and has optical characteristics of transmitting a linearly polarized light component parallel to the transmission axis and reflecting a linearly polarized light component parallel to the reflection axis in regard to two linearly polarized light components orthogonal to each other in an incident light; a first optical system which allows a first image light exiting from the image display unit to fall on the reflection polarizing plate from its surface on the observation side; a second optical system which allows a second image light exiting from the image display unit to enter the reflection polarizing plate from the other surface thereof; and display driving means for alternately displaying the first image and the second image in the image display unit, the structure is simple, and hence this device can be readily manufactured.

In this liquid crystal display device, it is desirable that the image combining element is arranged in parallel with the image display unit on a side in the lateral direction as seen from an observation side, the first optical system includes a first reflection element which is arranged on the observation side of the image display unit and the image combining element, reflects a first image light displayed on the one surface of the image display unit and allows this light to fall on the image combining element from its surface on the observation side, the second optical element includes a second reflection element which is arranged on a rear surface side opposite to the observation side of the image display unit and the image combining element, reflects a second image light displayed on the other surface of the image display unit and allows this light to enter the image combining element from its rear surface side, and at least one of the first optical system and the second optical system is arranged at a slant with respect to the image display unit and the image combining element. With such an arrangement, the structure can be further simplified, and the entire device can be reduced in size.

Additionally, in this liquid crystal device, the display driving means may be configured to alternately display a first image and a second image having the same pattern but different brightness levels in the image display unit or alternately display an image for a left eye of a display observer and an image for a right eye of the display observer in the image display unit. When the display driving means is configured to alternately display a first image and a second image having the same pattern but different brightness levels in the image display unit, the display observer can observe a three-dimensional image having a depth. Further, when the display driving means is configured to alternately display an image for a left eye and an image for a right eye in the image display unit, the display observer can observe a three-dimensional image having an spatial effect like a real thing.

In case of configuring the display driving means to display the image for a left eye and the image for a right eye in the image display unit, it is preferable that the image display unit, the image combining element and the first and second optical systems are arranged in an angular relationship by which, of a first image light exiting from the one surface of the image display unit and a second image light exiting from the other surface of the image display unit, the first image light which is caused to fall on the image combining element from its surface on the observation side by the first optical system and reflected by this image combining element exits in a direction of one of right and left eyes of a display observer and the second image light which is caused to enter the image combining element from the other surface thereof by the second optical system and transmitted through this image combining element exists in a direction of the other eye of the display observer. By adopting this configuration, the display observer is allowed to observe a three-dimensional image having a spatial effect light a real thing without using polarizing glasses.

In the present invention, the term "image display means displays two different sub-images (first and second images) constituting one image on one surface and the other surface" is used for representing such contents that the different sub-images may be seen form both sides of the image displaying means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
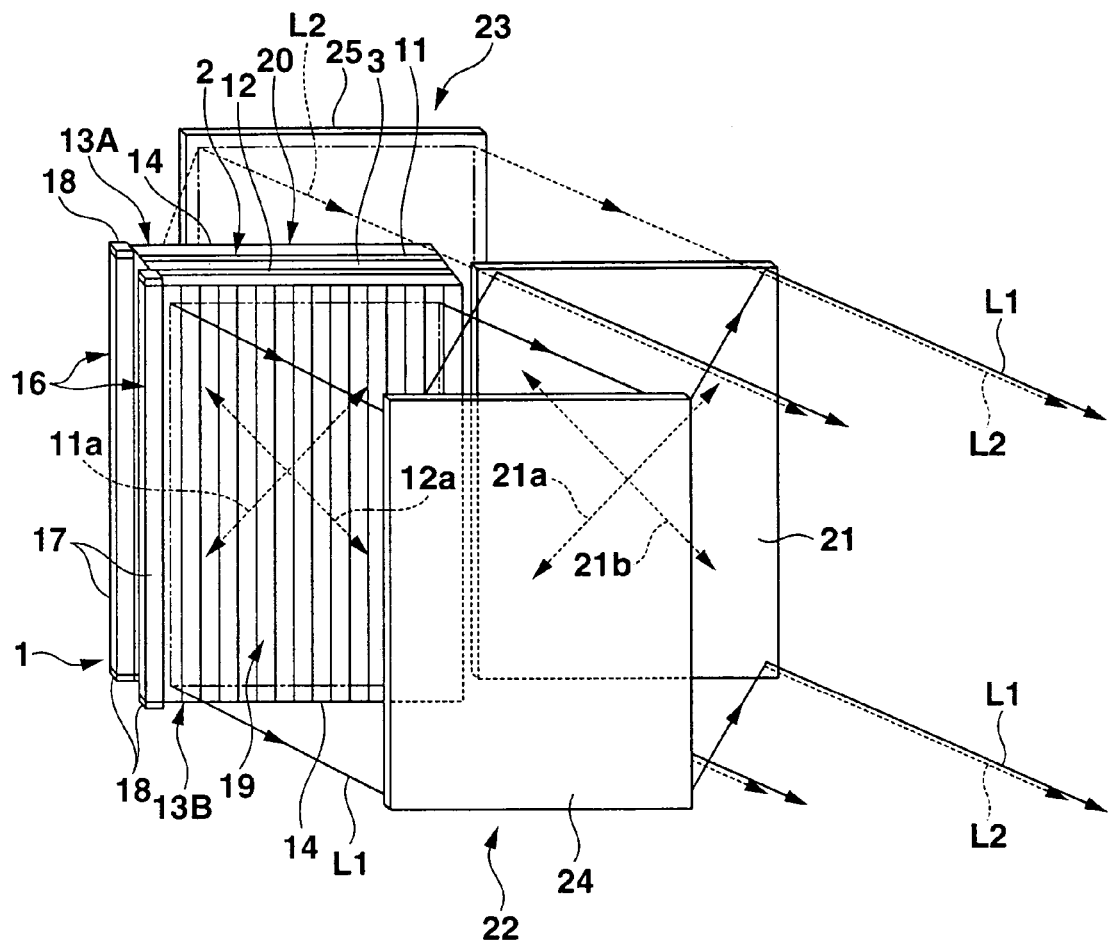
FIG. 1 is a perspective view of a liquid crystal display device showing a first embodiment of the present invention.
Figure 2:
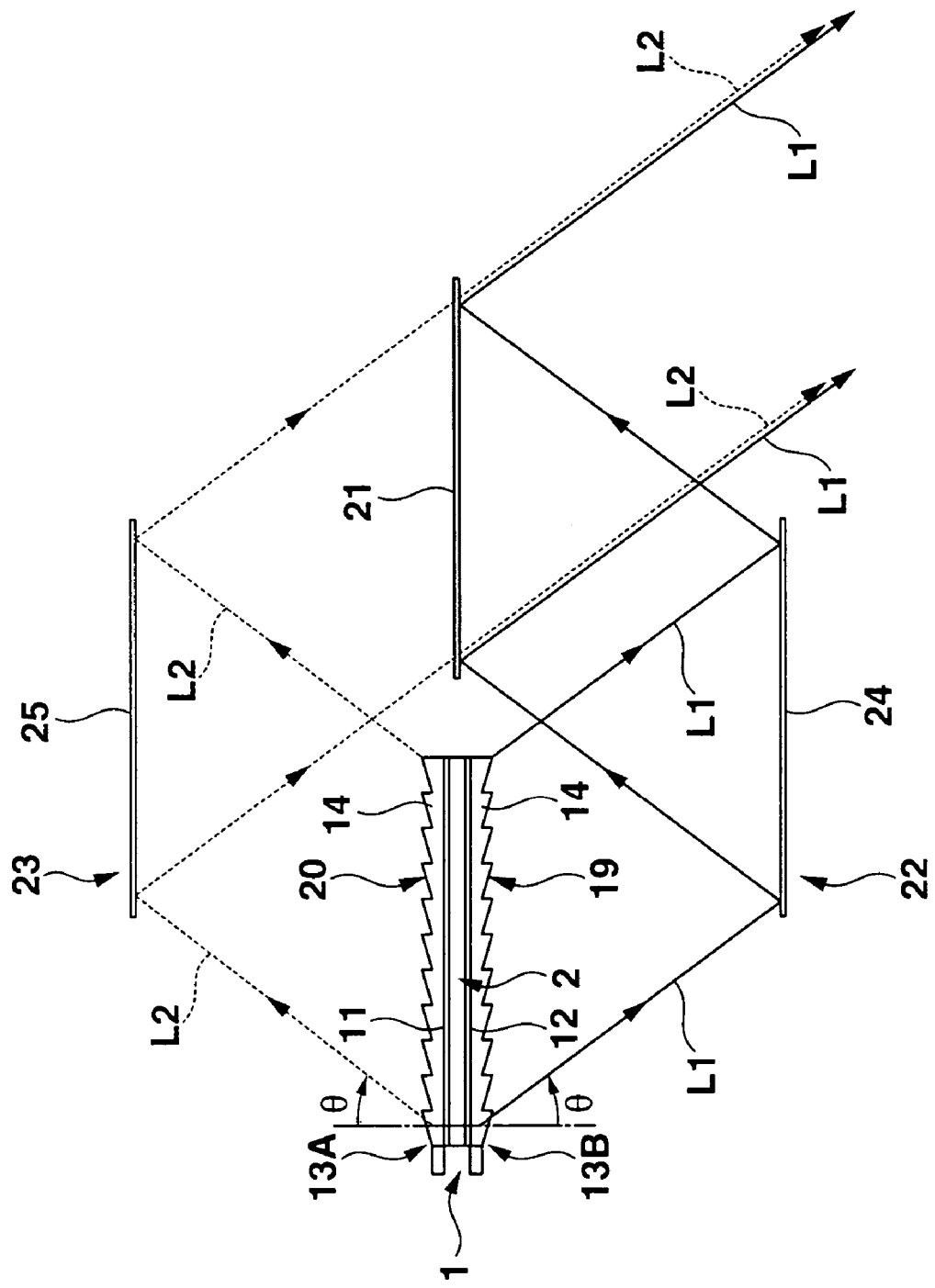
FIG. 2 is a plan view of the liquid crystal display device according to the first embodiment.

FIGS. 1 to 6 show a first embodiment according to the present invention, and FIGS. 1 and 2 are a perspective view and a plan view of a liquid crystal display device.

Embodiment

As shown in FIGS. 1 and 2, this liquid crystal display device includes an image display unit 1, a reflection polarizing plate 21; a first optical system 22, a second optical system 23, and display driving means 26. The image display unit 1 has first and second image light exit surfaces 19 and 20 on opposing surfaces, allows a first image light L1 including a linearly polarized light to exit from the first image light exit surface 19 and allows a second image light L2 including a linearly polarized light substantially orthogonal to a linear polarization direction of the first image light L1 to exit from the second image light exit surface 20, the first optical system 22 allows the first image light L1 exiting from the first image light exit surface 19 of the image display unit 1 to fall on the reflection polarizing plate 21 from its surface in one direction, i.e., on an observation side. The second optical system 23 allows the second image light L2 exiting from the second image light exit surface 20 of the image display unit 1 to enter the reflection polarizing plate 21 from the other surface thereof. The display driving means 26 (see FIG. 3) is provided for alternately displaying the first image and the second image in the image display unit 1.

Figure 3:
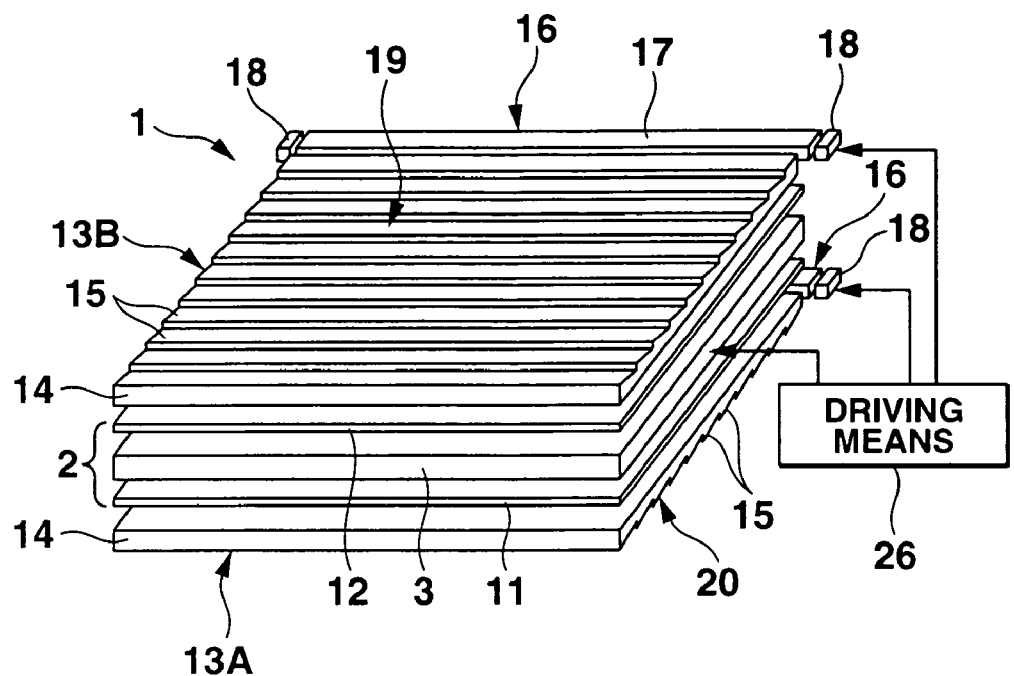
FIG. 3 is a perspective view of an image display unit.
Figure 4:
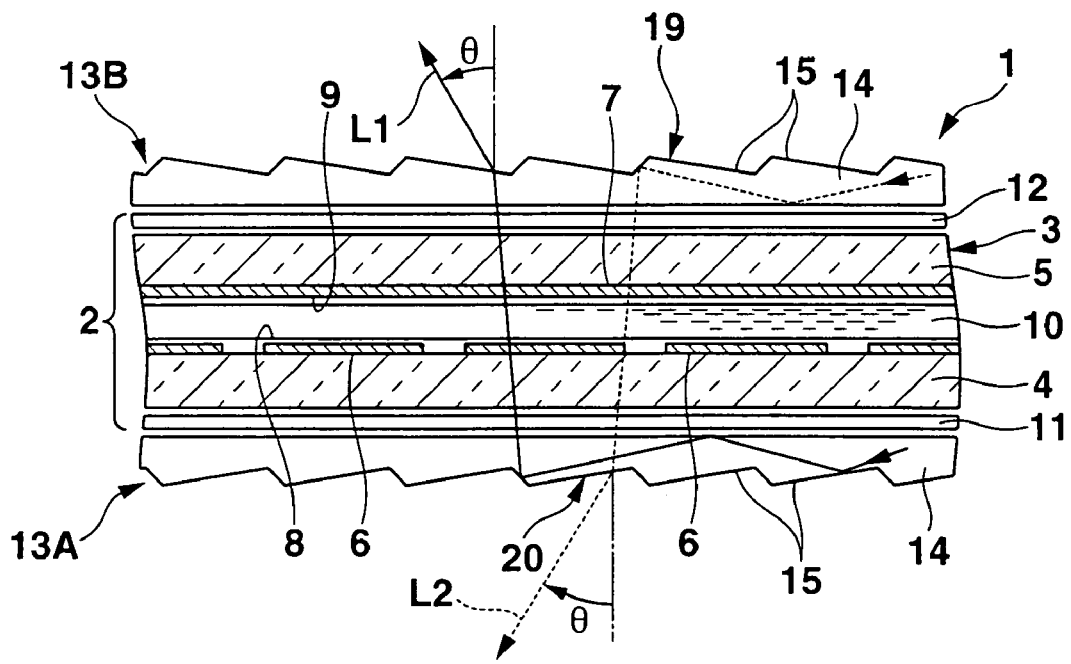
FIG. 4 is a partially enlarged cross-sectional view of the image display unit.

FIGS. 3 and 4 are a perspective view and a partially enlarged cross-sectional view of the image display unit 1. The image display unit 1 includes a liquid crystal display element 2 which controls transmission of a light to display an image, and a pair of surface light sources 13A and 13B which are arranged to respectively face one surface and the other surface of the liquid crystal display element 2. The surface light sources 13A and 13B irradiate the liquid crystal display element 2 with illumination lights from the surfaces facing the liquid crystal display element and transmit the image lights L1 and L2 exiting from the liquid crystal display element 2 to exit from the opposite surfaces.

The liquid crystal display element 2 includes a liquid crystal cell 3, and a pair of polarizing plates 11 and 12 arranged with this liquid crystal cell 3 therebetween. The liquid crystal cell 3 is provided with transparent electrodes 6 and 7 which form a plurality of pixels arranged in a matrix form in a row direction and a column direction by opposing areas on opposing inner surfaces of a pair of transparent substrates 4 and 5 bonded to each other through a non-illustrated frame-like sealing material; and aligning films 8 and 9 formed to cover the electrodes 6 and 7. The liquid crystal cell 3 includes a liquid crystal layer 10 provided in an area surrounded by the sealing material between these substrates 4 and 5.

The liquid crystal cell 3 is of an active matrix type using, e.g., a TFT (a thin film transistor) as an active element. The electrode 6 provided on the inner surface of one substrate 4 is a plurality of pixel electrodes arranged in a matrix form in a row direction and a column direction, and the electrode 7 provided on the inner surface of the other substrate 5 is one film-like opposing electrode facing the plurality of pixel electrodes.

Although not shown, a plurality of TFTs respectively connected with the plurality of pixel electrodes, a plurality of gate wirings which supply a gate signal to the TFTs on each row and a plurality of data wirings which supply a data signal to the TFTs on each column are provided on the inner surface of one substrate 4 having the plurality of pixel electrodes provided thereon.

Further, although not shown, a bulge section which protrudes toward the outside of one substrate 5 is formed to the other substrate 4, and the plurality of gate wirings and the plurality of data wirings are led to the bulge section.

Furthermore, the pair of polarizing plates 11 and 12 are absorption polarizing plates which have transmission axes 11a and 12a (see FIG. 1) and an absorption axis (not shown) in two directions orthogonal to each other along their plate surfaces. Thus, polarizing plates transmit a linearly polarized light component parallel to the light transmission axes 11a and 12a and absorb a linearly polarized light component parallel to the absorption axis in regard to two linearly polarized light components orthogonal to each other in an incident light.

This liquid crystal display element 2 is a non-twisted homogeneous orientation type element in which liquid crystal molecules in the liquid crystal layer 10 of the liquid crystal cell 3 are homogeneously oriented with molecular long axes aligned in one direction or an TN (Twisted Nematic) type element in which liquid crystal molecules are twist-aligned between the pair of substrates 4 and 5 at a twist angle of substantially 90 degrees, and the pair of polarizing plates 11 and 12 are arranged with their light transmission axes 11a and 12a being substantially orthogonal to each other.

Moreover, each of the pair of surface light sources 13A and 13B includes an optical waveguide 14 having a superficial content facing the entire display area of the liquid crystal display element 2 in which a plurality of pixels are arranged in a matrix form, and a light source section 16 arranged on the side of the optical waveguide 14.

The optical waveguide 14 is formed of a transparent plate which has an incidence end surface formed at one end surface thereof, and one of its two opposed plate surfaces is formed into a flat surface whilst the other plate surface has an elongated shape along a lengthwise direction of the incidence end surface. Further, the transparent plate is formed into a saw-tooth surface shape in which a plurality of inclined surfaces 15 which are inclined in a direction apart from the flat surface are aligned from the incidence end surface side toward the other end surface side at a pitch smaller than a pixel pitch (approximately 100 to 250 μm) of the liquid crystal display element 2.

The light source section 16 arranged on the side of the optical waveguide 14 includes a light leading member 17 which is formed of a rod-like transparent material having substantially the same thickness and length as those of the incidence end surface of the optical waveguide 14, and has an incidence end surface formed at each of both end surfaces thereof, a light exit surface formed on a side surface facing the incidence end surface of the optical waveguide 14 and a reflection surface which reflects an incidence light from the incidence end surface and allows this light to exit from the light exit surface formed on a side surface on the opposite side. The light source section 16 further includes a light emitting element 18 which is arranged to face each of the incidence end surfaces at the both ends of this light leading member 17.

Although not shown, a plurality of concave sections which reflect an incident light from the incidence end surfaces at the both ends of the light leading member 17 in a direction along which an angle with respect to a normal line of the light exit surface becomes small and has a V plane shape are arranged on the reflection surface of the light leading member 17 at a pitch smaller than the pixel pitch of the liquid crystal display element 2.

Furthermore, the light emitting element 18 arranged to face each of the incidence end surfaces at the both ends of the light leading member 17 includes a solid-state light emitting element such as an LED (a light emitting diode) although its configuration is not shown.

Each of the pair of surface light sources 13A and 13B leads a light emitted from the light emitting element 18 by using the light leading member 17 to enter the optical waveguide 14 from its incidence end surfaces, and allows this light to exit from the flat surface of the optical waveguide 14. As indicated by an arrow line and a broken arrow line, the light which has entered the optical waveguide 14 from its incidence end surfaces is led by total reflection on the flat surface and an interface between the saw-tooth surface on the opposite side and outside air (air) and reflected by the plurality of inclined surfaces 15 on the saw-tooth surface in a direction along which an angle with respect to the normal line of the flat surface becomes small, and the light which has entered the interface between the flat surface and the outside air at an angle smaller than a total reflection critical angle is transmitted through the interface and caused to exit. As a result, an illumination light having a homogenous intensity distribution is allowed to exit from the entire flat surface toward a direction of the front surface (a direction in the vicinity of a normal line of the flat surface).

Each of the pair of surface light sources 13A and 13B transmits the light which has entered the optical waveguide 14 from one plate surface thereof and allows this light to exit from the other plate surface.

Of the pair of surface light sources 13A and 13B, one surface light source 13A is arranged on one surface side of the liquid crystal display element 2 in such a manner that the arrangement side of the light source section 16 is directed toward a predetermined direction (one edge section direction of a rim of the liquid crystal display element 2) and the flat surface of the optical waveguide 14 faces the outer surface of the polarizing plate 11 on one surface side of the liquid crystal display element 2. The other surface light source 13B is arranged on the other surface side of the liquid crystal display element 2 in such a manner that the arrangement side of the light source section 16 is directed toward the same direction as the light source section arrangement side of the surface light source 13A and the flat surface of the optical waveguide 14 faces the outer surface of the polarizing plate 12 on the other surface side of the liquid crystal display element 2.

The saw-tooth surface of the optical waveguide 14 of the other surface light source 13B opposite to the surface facing the liquid crystal display element 2 is determined as a first image light exit surface 19 of the image display unit 1. The saw-tooth surface of the optical waveguide 14 of one surface light source 13A opposite to the surface facing the liquid crystal display element 2 is determined as a second image light exit surface 20 of the image display unit 1.

The image display unit 1 displays a first image by an operation of writing first image data in the liquid crystal display element 2 and irradiation of an illumination light from one surface light source 13A of the pair of surface light sources 13A and 13B, allows a first image light L1 including a linearly polarized light having a polarization plane parallel to the transmission axis 12a of the polarizing plate 12 on the other surface light source 13B side of the liquid crystal display element 2 to exit from the first image light exit surface 19 including the opposite-side surface (the saw-tooth surface) of the other surface light source 13B, displays a second image by an operation of writing second image data in the liquid crystal display element 2 and irradiation of an illumination light from the other surface light source 13B, and allows a second image light L2 of a linearly polarized light having a polarization plane parallel to the transmission axis 11a of the polarizing plate 11 on one surface light source 13A side of the liquid crystal display element 2, i.e., a linearly polarized light having a polarization plane substantially orthogonal to the linearly polarized light polarization surface of the first image light L1 to exit from the second image light exit surface 20 including the opposite-side surface (the saw-tooth surface) of one surface light source.

Each of the first and second image lights L1 and L2 is a light which has exited from the flat surface of the optical waveguide 14 of each of the surface light sources 13A and 13B in a direction of the front side of the flat surface and has been transmitted in accordance with the image data written in the liquid crystal display element 2. These image lights L1 and L2 enter the optical waveguide 14 of the surface light source 13B from its flat surface, are refracted by the plurality of the inclined surfaces 15 from the saw-tooth image light exit surfaces 19 and 20 of this optical waveguide 14, and then exit in a direction inclined toward the opposite direction of the arrangement side of the light source section 16 (the incidence end surface side of the optical waveguide 14) with respect to the normal line of the flat surface of the optical waveguide 14.

The refection polarizing plate 21 is a reflection polarizing plate having a transmission axis 21a and a reflection axis 21b in two directions orthogonal to each other along its plate surface. Thus the reflection polarizing plate has optical characteristics of transmitting a linearly polarized light component parallel to the transmission axis 21a and reflecting a linearly polarized light component parallel to the reflection axis 21b in regard to two linearly polarized light components orthogonal to each other in an incident light. The reflection polarizing plate 21 is arranged in such a manner that one surface thereof is directed toward the observation side of display (an obliquely lower right direction in FIG. 2), a direction of the reflection axis 21b is set in substantially parallel with a direction of the polarization surface of the first image light L1 exiting from the first image light exit surface 19 of the image display unit 1 and a direction of the transmission axis 21a is set in substantially parallel with a direction of the polarization plane of the second image light L2 exiting from the second image light exit surface 20 of the image display unit 1.

The image display unit 1 is arranged on the side of the reflection polarizing plate 21 in close proximity to this refection polarizing plate 21 in such a manner that the first image light exit surface 19 is directed in the substantially same direction as the direction of the observation-side surface (which will be referred to as a front surface hereinafter) of the reflection polarizing plate 21 and the second image light exit surface 20 is directed in substantially the same direction as the direction of the other surface (which will be referred to as a rear surface hereinafter) of the reflection polarizing plate 21.

Furthermore, the first optical system 22 which allows the first image light L1 exiting from the first image light exit surface 19 of the image display unit 1 to fall on the reflection polarizing plate 21 from the front surface thereof includes one flat reflector 24 which is arranged outside the first image light exit surface 19 of the image display unit 1 and the front surface of the reflection polarizing plate 21 to face adjacent areas of these surfaces. The second optical system 23 which allows the second image light L2 exiting from the second image light exit surface 20 of the image display unit 1 to enter the reflection polarizing plate 21 from its rear surface includes one flat reflector 25 which is arranged outside the second image light exit surface 20 of the image display unit 1 and the rear surface of the reflection polarizing plate 21 to face adjacent areas of these surfaces. The reflector 24 forming the first optical system 22 will be referred to a first reflector and the reflector 25 forming the second optical system 23 will be referred to as a second reflector hereinafter.

An inclination angle of the plurality of inclined surfaces 15 of the first and second image light exit surfaces 19 and 20 of the image display unit 1 is set in such a manner that the first and second image lights L1 and L2 exiting from the liquid crystal display element 2 are respectively reflected by the first and second reflectors 24 and 25 and caused to exit at an exit angle θ which allows these lights to fall on the reflection polarizing plate 21 in accordance with a relative position and angle of these image light exit surfaces 19 and 20, the reflection polarizing plate 21 and the first and second reflectors 24 and 25.

In this embodiment, as shown in FIGS. 1 and 2, the image display unit 1 is arranged in parallel with the reflection polarizing plate 21 with the center of the liquid crystal display element 2 in a thickness direction being matched with an extended surface of the front surface of the reflection polarizing plate 21. The first and second reflectors 24 and 25 are arranged in parallel with the reflection polarizing plate 21 at positions apart from the center of the liquid crystal display element 2 in the thickness direction and the front surface of the reflection polarizing plate 21 toward the front side (outside the first image light exit surface 19 of the image display unit 1 and the front surface of the refection polarizing plate 21) and the rear side (outside the second image light exit surface 19 of the image display unit 1 and the rear surface of the reflection polarizing plate 21) by the same distance in such a manner that the reflection surfaces of these reflectors 24 and 25 correspond to a middle point between the liquid crystal display element 2 and the reflection polarizing plate 21. Each exit angle θ (the inclination angle of the plurality of inclined surfaces 15) of the first and second image lights L1 and L2 from the first and second image light exit surfaces 19 and 20 of the image display unit 1 is set in such a manner that a light exiting from a display area of the liquid crystal display element 2 is caused to fall on the reflection surfaces of the reflectors 24 and 25 to be reflected toward the reflection polarizing plate 21.

Moreover, the image driving means 26 for alternately displaying the first image and the second image in the image display unit 1 includes a display element drive circuit and a surface light source drive circuit. The drive circuit sequentially selects each gate wiring of the liquid crystal display element 2 to supply a gate signal to the selected wiring, and supplies a data signal corresponding to image information fed from the outside to each data wiring in accordance with selection of each gate wiring in order to alternately write first and second image data in each pixel of the liquid crystal display element 2. The surface light source drive circuit turns on the light emitting element of the light source section 16 in each of the pair of surface light sources 13A and 13B, although the configuration thereof is not shown.

The image display unit 1 may be a solid-state light emitting element which has color filters of red, green and blue corresponding to each pixel provided to the liquid crystal display element 2 and includes a white LED which allows the light emitting element 18 of each of the pair of surface light sources 13A and 13B to emit a white light, or may be a solid-state light emitting diode which does not have color filters provided to the liquid crystal display element 2 and includes a red LED, a green LED and a blue LED which allow the light emitting element 18 of each of the pair of surface light sources 13A and 13B to emit a red light, a green light and a blue light, respectively.

Additionally, when the image display unit 1 includes the solid-state light emitting element which does not have the color filters provided to the liquid display element 2 and includes the red LED, the green LED and the blue LED which allow the light emitting element 18 of each of the two surface light sources 13A and 13B to emit respective color lights, the display driving means 26 is configured to display a color image in the image display unit 1 based on field sequential display.

Figure 5:
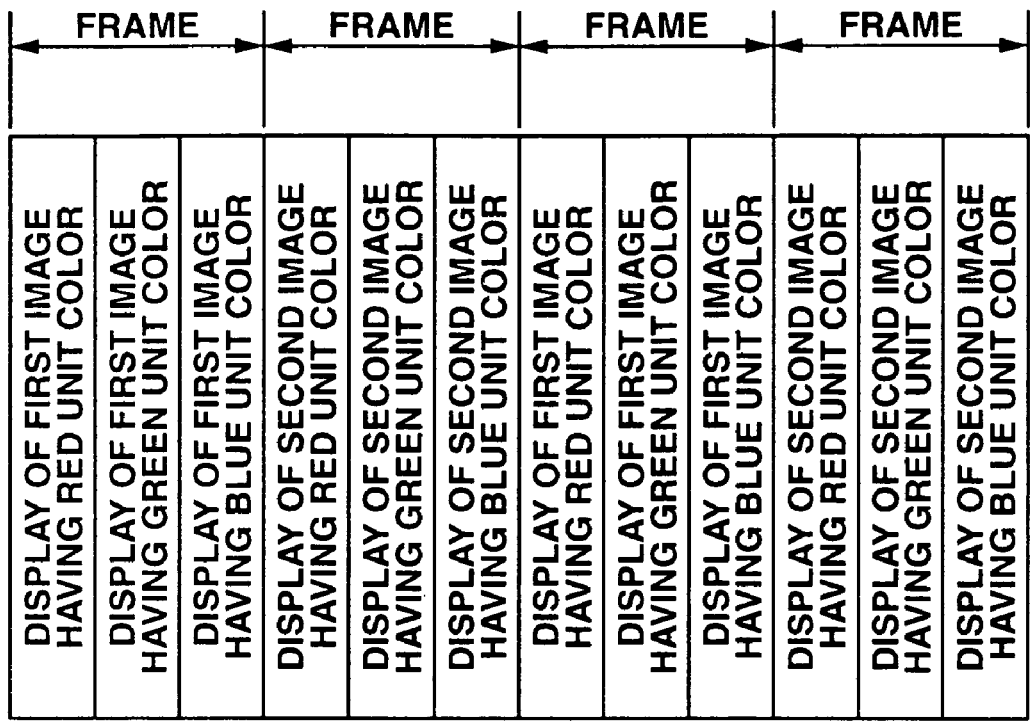
FIG. 5 is a display sequence diagram when causing the image display unit to perform field sequential display.

FIG. 5 is a display sequential diagram when field sequential display is performed in the image display unit 1. In this case, writing of unit color image data of one color of red, green and blue of a first color image in the liquid crystal display element 2 and irradiation of an illumination light having a color corresponding to the written unit color image data from one surface light source 13A are repeated to sequentially display respective unit color images of red, green and blue of the first image color every other frame. Writing of unit color image data of one color of red, green and blue of a second color image in the liquid crystal display element 2 and irradiation of an illumination light of a color corresponding to the written unit color image data from the other surface light source 13B are repeated to sequentially display respective unit color images of red, green and blue of the second color image every other remaining frame. As a result, the first color image and the second color image are alternately displayed every frame.

It is to be noted that, in this field sequential display, the respective unit color images of red, green and blue of the first and second color images are respectively displayed by writing reset data which orients liquid crystal molecules in pixels of each row of the liquid crystal display element 2 substantially vertically with respect to the surfaces of the substrates 4 and 5, resetting the preceding frame write state, then writing the unit color image data of one of red, green and blue in pixels of each row of the liquid crystal display element 2, turning on the LED of a color corresponding to the written unit color image data of the LEDs of red, green and blue of the light emitting element 18 of one surface light source 13A or 13B after a response time of orientation of the liquid crystal molecules in an orientation state corresponding to the image data, and irradiating the liquid crystal display element 2 with the illumination light having this color from the surface light source 13A or 13B.

Figure 6:
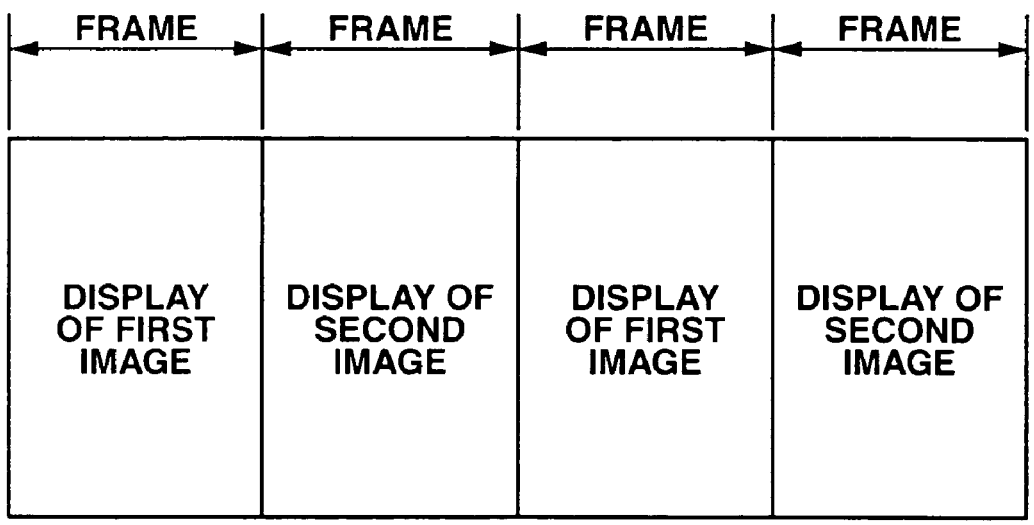
FIG. 6 is a display sequence diagram when a liquid crystal display element of the image display unit is determined as a color image display element provided with color filters of three colors, i.e., red, green and blue.

Further, FIG. 6 is a display sequence diagram obtained by the display driving means 26 formed as the solid-state light emitting element which has colors filters of three colors, i.e., red, green and blue corresponding to respective pixels provided in the liquid display element 2 and includes a white LED which causes the light emitting element 18 of each of the pair of surface light sources 13A and 13B to emit a white light. In this case, a first color image is displayed by writing first color image data in the liquid display element 2 and emitting an illumination light from one surface light source 13A every other frame, and a second color image is displayed by writing second color image data in the liquid crystal display element 2 and emitting an illumination light from the other surface light source 13B every other remaining frame, thereby alternately displaying the first color image and the second color image every frame.

Furthermore, in this embodiment the display driving means 26 is configured to alternately display in the image display unit 1 the first image and the second image having the same pattern but different brightness levels every frame.

That is, in this embodiment, the first image having the high brightness and the second image having the same pattern as the first image but the brightness lower than that of the first image are alternately displayed in the image display unit 1 by setting the brightness of the illumination light from one of the pair of surface light sources 13A and 13B of the image display unit 1, e.g., one surface light source 13B which displays the second image to be lower than the brightness of the illumination light from the other surface light source 13A which displays the first image.

It is to be noted that a difference in brightness between the first image and the second image displayed in the image display unit 1 can be obtained by setting a voltage value of a data signal used to display the first image to be different from a voltage value of a data signal used to display the second image and setting a transmission factor of the liquid crystal display element 2 to differ depending on a case of displaying the first image and a case of displaying the second image. However, in terms of the easiness of display driving, it is advantageous to setting the brightness levels of the illumination lights from the pair of surface light sources 13A and 13B to be different from each other.

In this liquid crystal display device, the first image light L1 and the second image light L2 formed of linearly polarized lights substantially orthogonal to each other are caused to alternately exit from the first and second image light exit surfaces 19 and 20 of the image display unit 1, the first image light L1 exiting from the first image light exit surface 19 of this image display unit 1 is caused to fall on the reflection polarizing plate 21 from its observation-side surface (the front surface) by the first reflector 24 forming the first optical system 22, and the second image light L2 exiting from the second image light exit surface 20 of the image display unit 1 is caused to enter the reflection polarizing plate 21 from the other surface (the rear surface) thereof by the second reflector 25 forming the second optical system 23. As a result, the first image light L1 is reflected by the reflection polarizing plate 21 to exit toward the observation side, and the second image light L2 is transmitted through the reflection polarizing plate 21 to exit toward the observation side so that a display observer is allowed to observe a three-dimensional image obtained by combining the first image and the second image. In this embodiment, since the first image and the second image having the same pattern but different brightness levels are alternately displayed in the image display unit 1, the display observer can observe a three-dimensional image having a depth.

That is, in the liquid crystal display device according to this embodiment, a direction of the reflection axis 21b of the reflection polarizing plate 21 is set substantially equal to a linear polarization direction (a direction of the transmission axis 12a of the polarizing plate 12 on the other surface light source 13B side of the liquid crystal display element 2) of the first image light L1 exiting from the first image light exit surface 19 of the image display unit 1, and a direction of the transmission axis 21a of the reflection polarizing plate 21 is set substantially equal to a linear polarization direction (a direction of the transmission axis 11a of the polarizing plate 11 on one surface light source 13B side of the liquid crystal display element 2) of the second image light L2 exiting from the second image light exit surface 20 of the image display unit 1. Therefore, the first image light L1 which has exited from the first image light exit surface 19 of the image display unit 1, has been reflected by the first reflector 24 and has fallen on the reflection polarizing plate 21 from the front surface thereof is reflected by the reflected by the refection polarizing plate 21 to exit toward the observation side as indicated by arrow lines in FIGS. 1 and 2, and the second image light L2 which has exited from the second image light exit surface 20 of the image display unit 1, has been reflected by the second reflector 25 and has entered the reflection polarizing plate 21 from the rear surface thereof is transmitted through the reflection polarizing plate 21 to exit toward the observation side as indicated by the broken arrow lines in FIGS. 1 and 2.

Furthermore, in this liquid crystal display device, as shown in FIGS. 1 and 2, the image display unit 1 is arranged in parallel with the reflection polarizing plate 21 with the center of the liquid crystal display element 2 in the thickness direction being matched with the extended plane of the front surface of the reflection polarizing plate 21, and the first and second reflectors 24 and 25 are arranged in parallel with the reflection polarizing plate 21 at positions apart from the center of the liquid crystal display element 2 in the thickness direction and the front surface of the reflection polarizing plate 21 toward the front side and the rear side by the same distance in such a manner that the reflection surfaces of these reflectors 24 and 25 are associated between the display area of the liquid crystal display element 2 and the plate surface of the reflection polarizing plate 21. Moreover, the exit angle θ of each of the first and second image lights L1 and L2 from the first and second image light exit surfaces 19 and 20 of the image display unit 1 is set in such a manner that the light exiting from the display area of the liquid crystal display element 2 is caused to fall on the reflection surfaces of the reflectors 24 and 25 and reflected toward the front surface of the reflection polarizing plate 21. As a result, the first image light L1 which has fallen on the reflection polarizing plate 21 from the front surface thereof and has been reflected by this plate 21 and the second image light which has entered the plate 21 from the rear surface thereof and has been transmitted through this reflection polarizing plate 21 exit from substantially the same areas of the plate 21 toward substantially the same directions on the observation side.

Although the first and second image lights L1 and L2 alternately exit to the observation side every frame, the first image based on the first image light L1 and the second image based on the second image light L2 are seen as one image in which these images are superposed with a very small displacement corresponding to an observation angle (an angle with respect to the exit optical axis of the image light toward the observation side) of display in eyes of a display observer.

Additionally, in this embodiment, since the first image and the second image having the same pattern but different brightness levels are alternately displayed in the image display unit 1, an image having a lower brightness level of the first and second images superposed with a small displacement can be viewed as a shadow of an image having a high brightness level, and a three-dimensional image with a depth can be observed.

In this manner, the liquid crystal display device includes the image display unit 1, the image display unit 1 including the liquid crystal display element 2 and the pair of surface light sources 13A and 13B arranged to face one surface and the other surface of the liquid crystal display element 2, the image display unit 1 causing the first image light L1 formed of a linearly polarized light to exit from the first image light exit surface 19 including the opposite surface (the surface opposite to the surface facing the liquid crystal display element 2) of the other surface light source 13B by writing of the first image data in the liquid crystal display element 2 and irradiation of an illumination light from one surface light source 13A, and causing the second image light L2 formed of a linearly polarized light substantially orthogonal to the linear polarization direction of the first image light L1 to exit from the second image light exit surface 20 formed of the opposite surface of one surface light source 13A by writing of the second image data in the liquid crystal display element 2 and irradiation of an illumination light from the other surface light source 13B; the reflection polarizing plate 21 arranged in such a manner that one surface is directed toward the observation side of display, a direction of the reflection axis 21b is set substantially equal to the linear polarization direction of the first image light L1 and a direction of the transmission axis 21a is set substantially equal to the linear polarization direction of the second image light L2; the first optical system 22 which causes the first image light L1 exiting from the first image light exit surface 19 of the image display unit 1 to fall on the reflection polarizing plate 21 from the observation-side surface thereof; the second optical system 23 which causes the second image light L2 exiting from the second image light exit surface 20 of the image display unit 1 to enter the reflection polarizing plate 21 from the other surface thereof; and the display driving means 26 which alternately displays the first image and the second image in the image display unit 1. The first image light L1 and the second image light L2 consisting of linearly polarized lights substantially orthogonal to each other are caused to alternately exit from the first and second image light exit surfaces 19 and 20 of the image display unit 1, and the first image light L1 exiting from the first image light exit surface 19 of the image display unit 1 is caused to fall on the reflection polarizing plate 21 from the front surface thereof by the first optical system 22, whilst the second image light L2 exiting from the second exit surface 20 of the image display unit 1 is caused to enter the reflection polarizing plate 21 from the rear surface thereof by the second optical system 23. As a result, the first image light L1 is reflected by the reflection polarizing plate 21 to exit toward the observation side, and the second image light L2 is transmitted through the plate 21 to exit toward the observation side so that a display observer can observe a three-dimensional image obtained from the first image and the second image. Therefore, the precise first and second images having the same dot pitch as the pixel pitch of the liquid crystal display element 2 can be displayed in the image display unit 1, thereby displaying a three-dimensional image having a high resolution.

Further, this liquid crystal display device includes the image display unit 1 having a simple structure in which the pair of surface light sources 13A and 13B which emit illumination lights toward the liquid crystal display element 2 from the surfaces facing the liquid crystal display element 2 and transmit the light exiting from the liquid crystal display element 2 therethrough to exit from the surfaces opposite to the liquid crystal display element 2 side are arranged on one surface and the other surface of the liquid crystal display element 2; the reflection polarizing plate 21 which has the transmission axis 21a and the reflection axis 21b in two directions orthogonal to each other along the plate surface and has optical characteristics of transmitting a linearly polarized light component parallel to the transmission axis 21a and reflecting a linearly polarized light component parallel to the reflection axis 21b in regard to two linearly polarized light components orthogonal to each other of an incident light; the first optical system 22 which causes the first image light L1 exiting from the image display unit 1 to fall on the reflection polarizing plate 21 from the observation-side surface thereof; the second optical system 23 which causes the second image light L2 exiting from the image display unit 1 to enter the plate 21 from the other surface thereof; and the display driving means 26 which alternately displays the first image and the second image in the image display unit 1. Therefore, the structure is simple, and hence the liquid crystal display device can be readily manufactured.

Furthermore, in the liquid crystal display device according to the above-described embodiment, the image display unit 1 is arranged on the side of the reflection polarizing plate 21 in such a manner that the first image light exit surface 19 is set in substantially the same direction as the direction of the surface of the reflection polarizing plate 21 on the observation side and the second image light exit surface 20 is set in substantially the same direction as the direction of the other surface of the plate 21. The first optical system 22 includes one reflector 24 which is arranged outside the first image light exit surface 19 of the image display unit 1 and the observation-side surface of the reflection polarizing plate 21 in such a manner that this reflector faces an area on the side where these surfaces are adjacent to each other. The second optical system 23 includes one reflector 25 which is arranged outside the second image light exit surface of the image display unit 1 and the other surface of the plate 21 in such a manner that this reflector faces an area on the side where these surfaces are adjacent to each other. The image lights L1 and L2 exiting from the liquid crystal display element 2 are reflected from the first and second image light exit surfaces 19 and 20 of the image display unit 1 toward the reflectors 24 and 25 by the reflectors 24 and 25 to exit at the exit angle θ which allows these lights to enter/fall on the reflection polarizing plate 21. Therefore, the structure can be further simplified, and the entire device can be reduced in size.

It is to be noted that the first reflector 24 forming the first optical system 22 and the second reflector 25 forming the second optical system 23 are arranged in parallel with the reflection polarizing plate 21 in the first embodiment, but these reflectors 24 and 25 may be arranged in such a manner that they are inclined with respect to the plate 21 at substantially the same angles in opposite directions.

Figure 7:
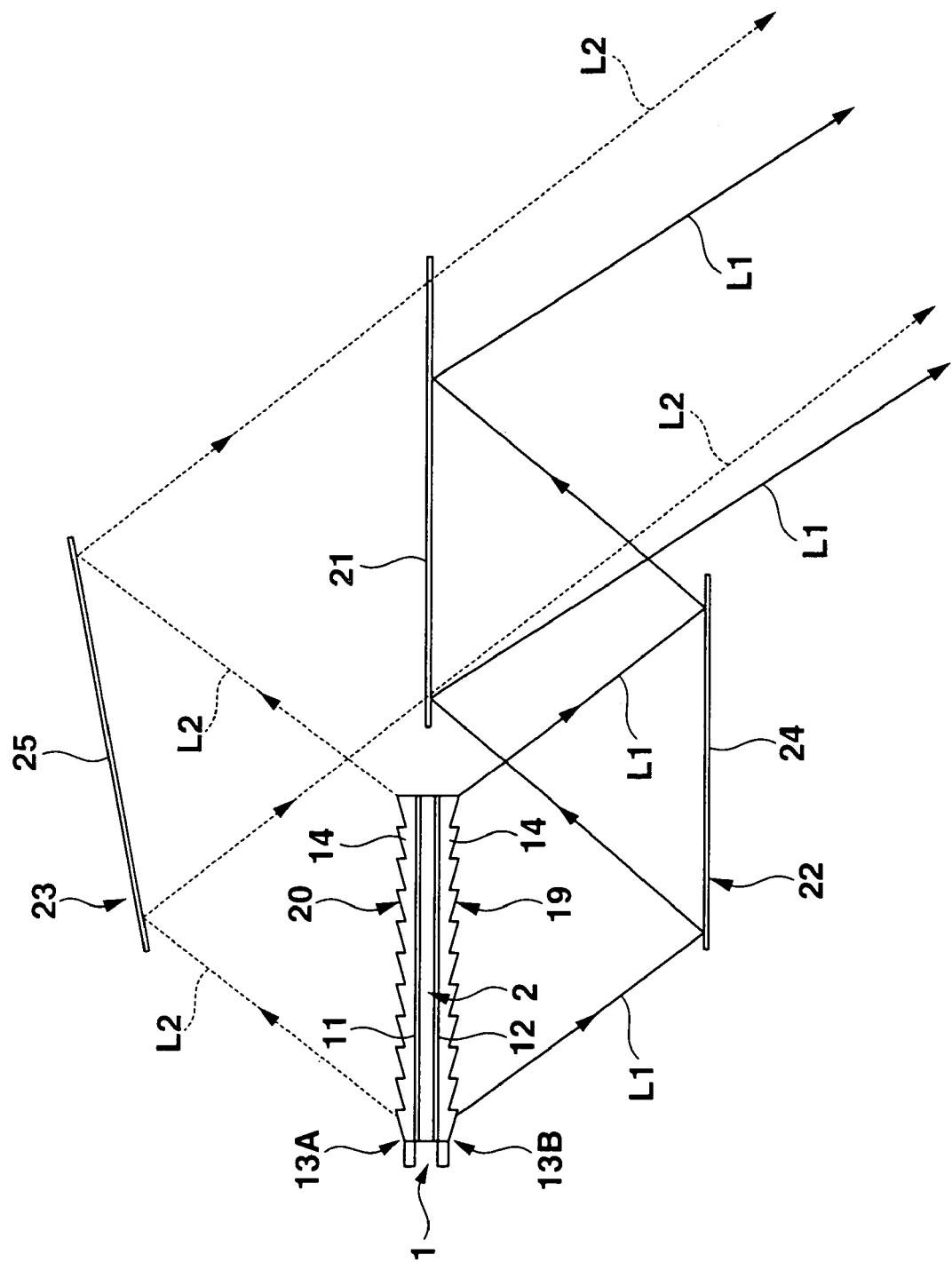
FIG. 7 is a plan view of a liquid crystal display device showing a second embodiment of the present invention.

FIG. 7 is a plan view of a liquid crystal display device showing a second embodiment of the present invention. In the liquid crystal display device according to this embodiment, like the first embodiment, the image display unit 1 is arranged in parallel with the reflection polarizing plate 21 with the center of the liquid display element 2 in the thickness direction being matched with the extended plane of the front surface of the plate 21. The first and second reflectors 24 and 25 are arranged at positions apart from the center of the liquid crystal display element 2 in the thickness direction and the front surface of the reflection polarizing plate 21 toward the front side and the rear side by the same distance in such a manner that the reflection surfaces of these reflector 24 and 25 correspond to a space between the display area of the liquid crystal display element 2 and the plate surface of the reflection polarizing plate 21 and that one of the reflectors 24 and 25 is inclined at a predetermined angle in a direction distanced from the reflection polarizing plate 21 toward the edge section side facing the plate 21 from the edge section side facing the image display unit 1. Further, the exit angle θ of each of the first and second image lights L1 and L2 from the first and second image light exit surfaces 19 and 20 of the image display unit 1 is set in such a manner that a light exiting from the display area of the liquid crystal display element 2 is caused to fall on the reflection surfaces of the reflectors 24 and 25 to be reflected toward the reflection polarizing plate 21.

That is, in this liquid crystal display device according to the second embodiment, the first reflector 24 is arranged to be inclined 5 to 10° toward the reflection polarizing plate 21. In this liquid crystal display device, the first image light L1 which has exited from the first image light exit surface 19 of the image display unit 1, has been reflected by the first reflector 24 forming the first optical system 22, has fallen on the reflection polarizing plate 21 from the front surface thereof and has been reflected by this plate 21 and the second image light L2 which has exited from the second image light exit surface 20 of the image display unit 1, has been reflected by the second reflector 25 forming the second optical system 23, has entered the reflection polarizing plate 21 from the rear surface thereof and has been transmitted through this plate 21 exit in a direction deviating from the plate 21 by 5 to 10° on the observation side.

Furthermore, in the above-described embodiment, the image display unit 1 is driven by the display driving means 26 so that the first image for one of right and left eyes of a display observer and the second image for the other eye of the display observer are alternately displayed, and hence the display observer can observe a three-dimensional image having a spatial effect like a real thing.

Figure 8:
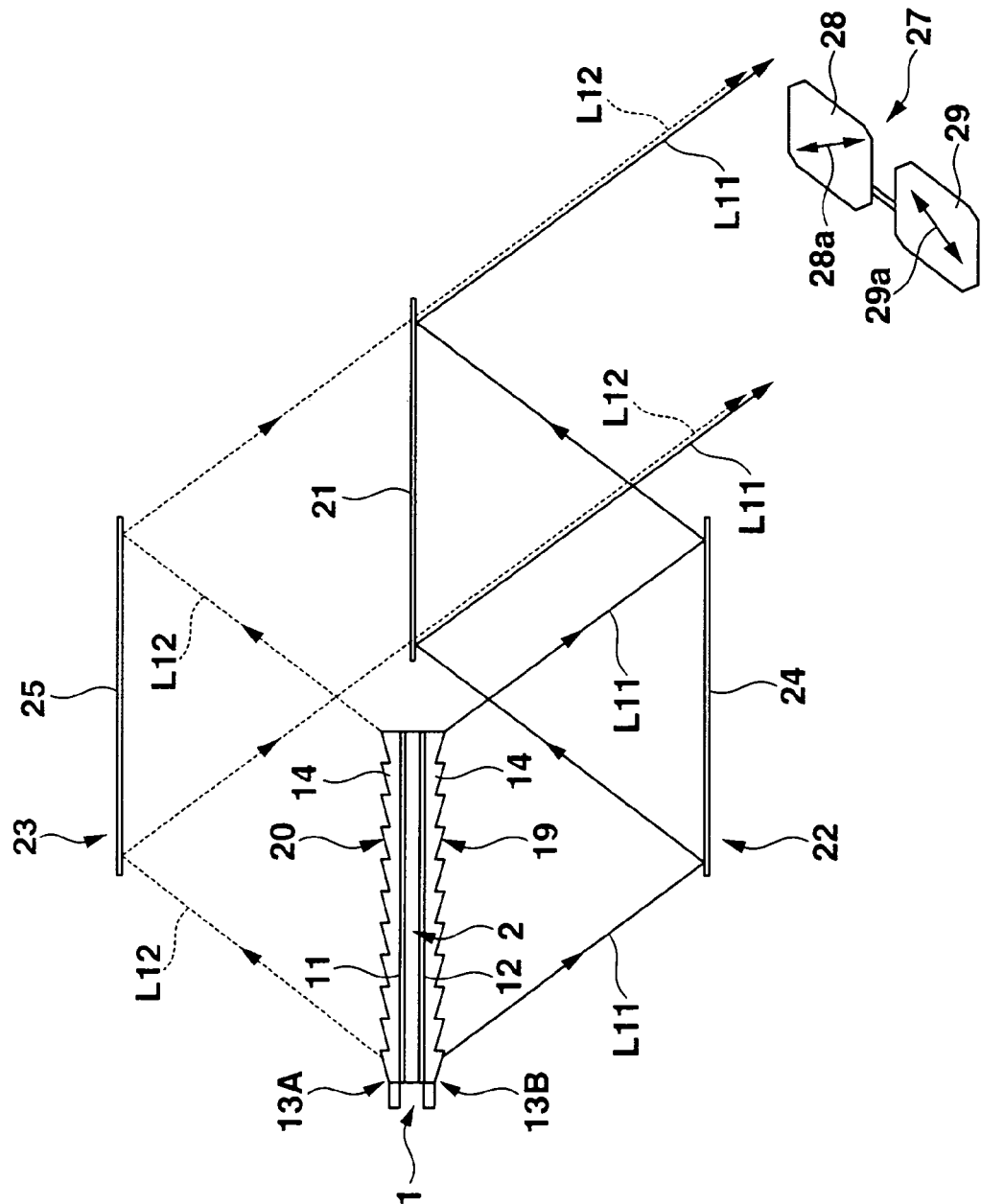
FIG. 8 is a plan view of a liquid crystal display device showing a third embodiment of the present invention.

FIG. 8 is a plan view of a liquid crystal display device showing a third embodiment of the present invention. According to this embodiment, in the liquid crystal display device according to the first embodiment, the display driving means 26 depicted in FIG. 3 is configured to alternately display the first image for one of right and left eyes of a display observer and the second image for the other eye of the display observer in the image display unit 1 so that the display observer can observe a three-dimensional image having a spatial effect like a real thing by using polarizing glasses 27.

It is to be noted that, in this embodiment, a right-eye image light L11 is caused to exit from the first image light exit surface 19 of the image display unit 1, and a left-eye image light L12 is caused to exit from the second image light exit surface 20 so that a display observer can observe the three-dimensional image having a spatial effect by using polarizing glasses 27 including a right-eye polarizing plate 28 which has a transmission axis 28a in substantially the same direction as the linear polarization direction (a direction of the transmission axis 12a of the polarizing plate 12 on the other surface light source 13B side of the liquid crystal display element 2) of the right-eye image light L11 exiting from the first image light exit surface 19 of the image display unit 1 and a left-eye polarizing plate 29 which has a transmission axis 29a in substantially the same direction as the linear polarization direction (a direction of the transmission axis 11a of the polarizing plate 11 on one surface light source 13B side of the liquid crystal display element 2) of the left-eye image light L12 exiting from the second image light exit surface 20 of the image display unit 1.

Figure 9:
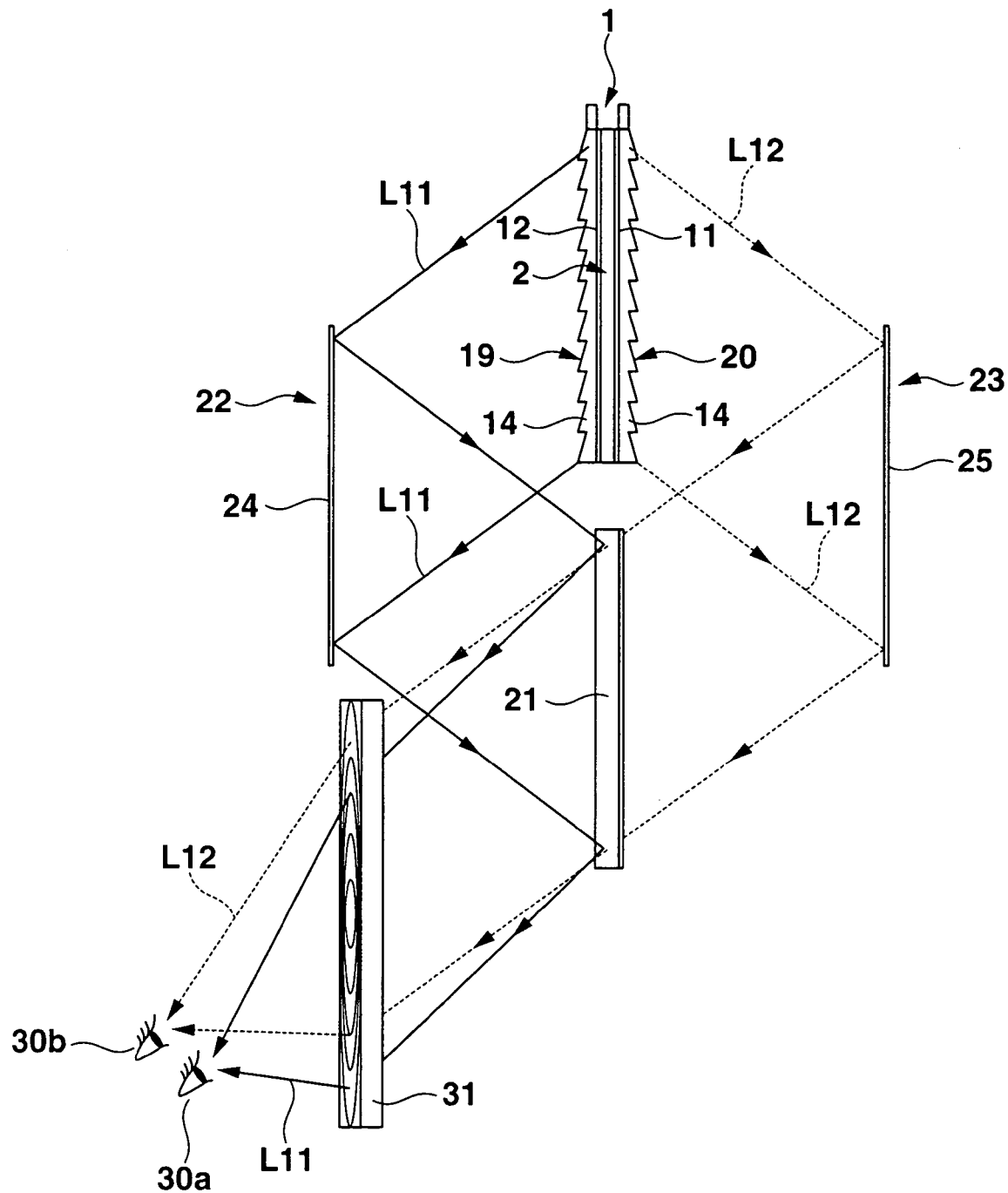
FIG. 9 is a side view of a liquid crystal display device showing a fourth embodiment of the present invention.
Figure 10:
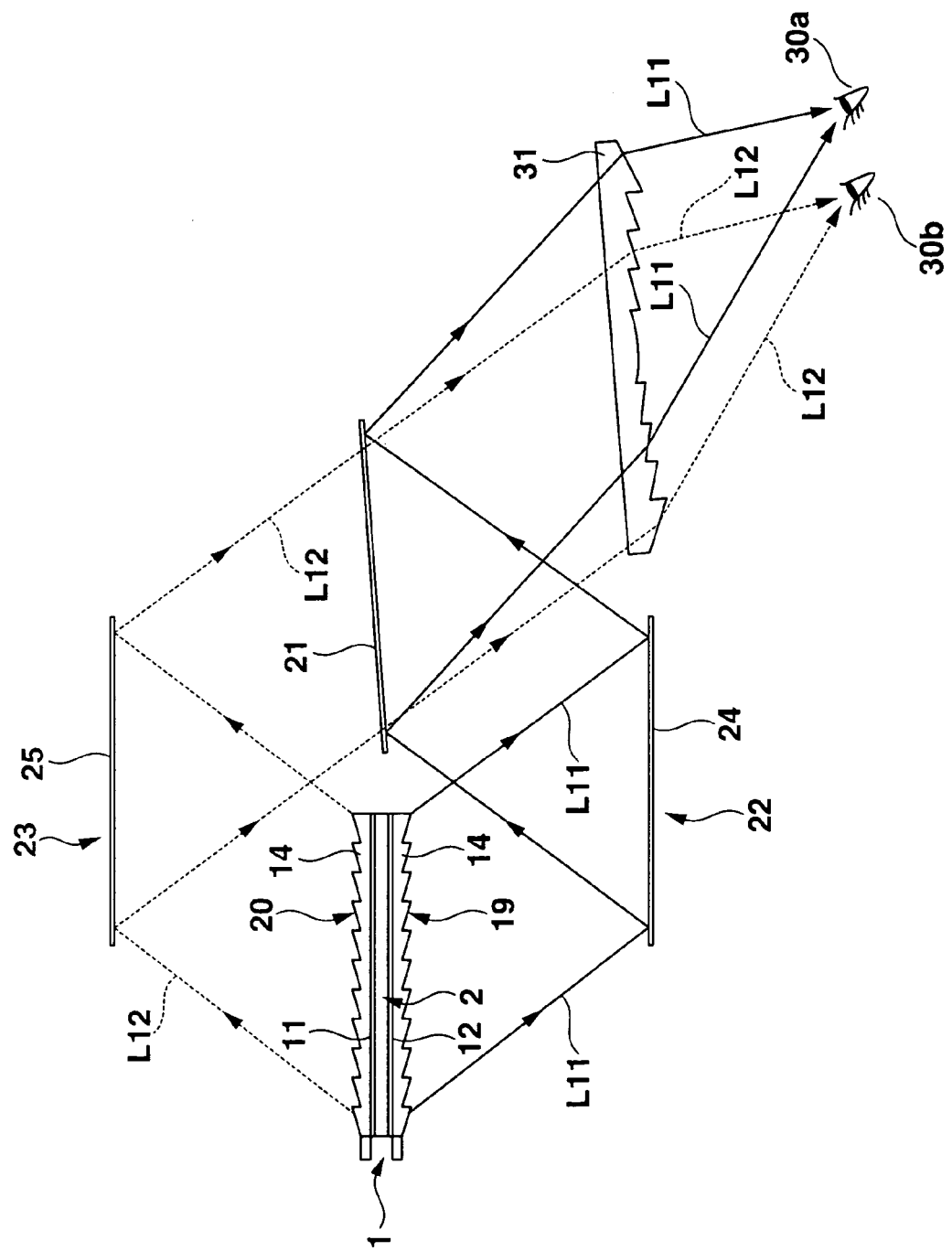
FIG. 10 is a plan view of a liquid crystal display device showing a fifth embodiment of the present invention.

Moreover, FIG. 9 is a side view of a liquid crystal display device showing a fourth embodiment of the present invention, and FIG. 10 is a plan view of a liquid crystal display device showing a fifth embodiment of the present invention. According to the fourth and fifth embodiments, the display driving means 26 is configured to alternately display the first image for one of right and left eyes of a display observer and the second image for the other eye of the display observer in the image display unit 1. Additionally, the image display unit 1, the reflection polarizing plate 21 and the first and second reflectors 24 and 25 forming the first and second optical systems 22 and 23 are arranged in an angular relationship in which, of the first image light exiting from the first image light exit surface 19 of the image display unit 1 and the second image light exiting from the second image light exit surface 20 of the image display unit 1, the first image light which has been caused to fall on the reflection polarizing plate 21 from the observation-side surface (the front surface) thereof by the first reflector 24 and reflected by this plate 21 exits in a direction of one of right and left eyes of a display observer and the second image which has been caused to enter the reflection polarizing plate 21 from the other surface (the rear surface) thereof by the second reflector 25 and transmitted through this plate 21 exits in a direction of the other eye of the display observer. As a result, the display observer can observe a three-dimensional image having a spatial effect like a real thing without using the polarizing glasses 27 or the like.

That is, in the liquid crystal display device according to the fourth embodiment shown in FIG. 9, the image display unit 1 and the reflection polarizing plate 21 are arranged to be aligned in the vertical direction as seen from an observer, and the first reflector 24 forming the first optical system 22 and the second reflector 25 forming the second optical system 23 are arranged on the front side and the rear side of these members. In this embodiment, the image display unit 1 and the first and second reflectors 24 and 25 are arranged in parallel with each other, and the reflection polarizing plate 21 is arranged to be inclined in the lateral direction with respect to the image display unit 1 and the reflectors 24 and 25 at a predetermined angle (e.g., approximately 5 to 10°).

Further, in this embodiment, the reflection polarizing plate 21 is inclined in a direction along which the left side (the side adjacent to the image display unit 1) as seen from the display observation side is close to the observation side and the right side is distanced from the observation side. As a result, the first image light which has exited from the first image light exit surface 19 of the image display unit 1, has been reflected by the first reflector 24 and has fallen on the reflection polarizing plate 21 from the observation-side surface (the front surface) thereof is reflected by the plate 21 to exit in a direction of a right eye 30a of a display observer, whilst the second image light which has exited from the second image light exit surface 20 of the image display unit 1, has been reflected by the second reflector 25 and has entered the reflection polarizing plate 21 from the other surface (the rear surface) thereof is transmitted through the plate 21 to exit in a direction of a left eye 30b of the display observer. Furthermore, the right-eye image light L11 is caused to exit from the first image light exit surface 19 of the image display unit 1, and the left-eye image light L12 is caused to exit from the second image light exit surface 20 so that the display observer can observe a three-dimensional image having a spatial effect like a real thing.

Moreover, in this embodiment a condenser lens 31 including a circular Fresnel lens or the like is arranged on the observation side of the reflection polarizing plate 21, the right-eye image light L1 reflected by the plate 21 and the left-eye image light L12 transmitted through the plate 21 are condensed in the vicinity of the right eye 30a and the left eye 30b of the display observer by the condenser lens 31, thereby enabling observation of a brighter three-dimensional image.

Additionally, in the liquid crystal display device according to the fifth embodiment shown in FIG. 10, the image display unit 1 and the reflection polarizing plate 21 are arranged to be aligned in the lateral direction, and the first reflector 24 forming the first optical system and the second reflector 25 forming the second optical system 23 are arranged on the front side and the rear side of these members. In this embodiment, the image display unit 1 and the first and second reflectors 25 and 25 are arranged in parallel with each other, and the reflection polarizing plate 21 is arranged to be inclined vertically with respect to the image display unit 1 and the reflectors 24 and 25 at a predetermined angle (e.g., approximately 5 to 10°).

Further, in this embodiment, by inclining the reflection polarizing plate 21 in a direction along which the left side as seen from the display observation side (the side adjacent to the image display unit 1) is close to the observation side and the right side is distanced from the observation side, the first image light which has exited from the first image light exit surface 19 of the image display unit 1, has been reflected by the first reflector 24 and has fallen on the reflection polarizing plate 21 from the observation-side surface (the front surface) is reflected by the plate 21 to exit in a direction of the right eye 30a of a display observer, and the second image light which has exited from the second image light exit surface 20 of the image display unit 1, has been reflected by the second reflector 25 and has entered the reflection polarizing plate 21 from the other surface (the rear surface) thereof is transmitted through this plate 21 to exit in a direction of the left eye 30b of the display observer. Furthermore, the right-eye image light L11 is caused to exit from the first image light exit surface 19 of the image display unit 1, and the left-eye image light L12 is caused to exit from the second image light exit surface 20, thereby enabling the display observer to observe a three-dimensional image having a spatial effect like a real thing.

Moreover, in this embodiment, the condenser lens 31 including a circular Fresnel lens or the like is arranged on the observation side of the reflection polarizing plate 21, and the right-eye image light L11 reflected by the plate 21 and the left-eye image light L12 transmitted through the plate 21 are condensed by the condenser lens 31 in the vicinity of the right eye 30a and the left eye 30b of the display observer, thereby enabling observation of a brighter three-dimensional image.

It is to be noted that, in the fourth and fifth embodiments, the image display unit 1 and the first and second reflectors 24 and 25 are arranged in parallel with each other and the reflection polarizing plate 21 is inclined with respect to the image display unit 1 and the reflectors 24 and 25, but the present invention is not restricted thereto. One of the image display unit 1, the reflection polarizing plate 21 and the first and second reflectors 24 and 25, or two or all of them may be arranged at different angles. Further, of the first image light exiting from the first image light exit surface 19 of the image display unit 1 and the second image light exiting from the second image light exit surface 20 of the image display unit, the first image light which has fallen on the reflection polarizing plate 21 from the observation-side surface thereof by the first reflector 24 and reflected by this plate 21 may be caused to exit in a direction of one of right and left eyes of a display observer, and the second image light which has entered the reflection polarizing plate 21 from the other surface thereof by the second reflector 25 and transmitted through this plate 21 may be caused to exit in a direction of the other eye of the display observer.

Furthermore, although the first optical system 22 which allows the first image light exiting from the first image light exit surface 19 of the image display unit 1 to fall on the reflection polarizing plate 21 from the observation-side surface and the second optical system 23 which allows the second image light exiting from the second image light exit surface 20 of the image display unit 1 to enter the reflection polarizing plate 21 from the other surface thereof are respectively formed by using the reflectors 24 and 25 each consisting of one plate in the first to fifth embodiments, the first and second optical systems 22 and 23 may be formed by using a plurality of reflectors.

Moreover, in each of the foregoing embodiments, the liquid crystal display element 2 of the image display unit 1 has the configuration in which the light transmission axes 11a and 12a of the pair of polarizing plates 11 and 12 arranged with the liquid crystal cell 3 therebetween are substantially orthogonal to each other. However, the pair of polarizing plates 11 and 12 of the liquid crystal display element 2 may be arranged in such a manner that their light transmission axes 11a and 12a are substantially parallel to each other, and a $\lambda/2$ plate which provides a phase difference of a ½ wavelength between an ordinary light and an abnormal light of a transmitted light may be arranged to an outer surface of one of these polarizing plates or an opposite surface (a surface opposite to a surface facing the liquid crystal display element 2) of one of the pair of surface light sources 13A and 13B, i.e., one of the first and second image light exit surfaces 19 and 20, thereby causing the first and second image lights consisting of linearly polarized lights substantially orthogonal to each other to exit from the first and second image light exit surfaces 19 and 20 of the image display unit 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A display device comprising:
    an image display unit having one surface and a second surface on which different first and second images are alternately displayed, respectively;
    a first optical system which leads first image light corresponding to the first image displayed on the first surface of the image display unit;
    a second optical system which leads second image light corresponding to the second image displayed on the second surface of the image display unit; and
    an image combining element on which the first and second image lights led by the first optical system and the second optical system are alternately incident, and which coincides first and second light paths of the first and second image lights, and emits combined image light of a combined image formed by combining the first and second images to an observation side,
    wherein the image display unit includes:
        a transmission type display element which controls transmission of light; and
        two surface light sources which are respectively arranged on both sides of the display element, which irradiate the display element with illumination lights, and which emit the first and second image lights transmitted through and exiting from the display element therethrough respectively toward the first and second optical systems in respective directions inclined to a normal line of the display element by a predetermined angle.

2. The display device according to claim 1, wherein:
    the transmission type display element comprises a liquid crystal display element which includes a liquid crystal panel, and a pair of polarizing plates arranged with the liquid crystal panel therebetween, and
    the liquid crystal panel comprises a pair of substrates having at least one electrode formed on each of opposed surfaces thereof and a liquid crystal layer provided between the pair of substrates.

3. The display device according to claim 1, wherein:
    the first optical system includes a first reflection element which reflects the first image light corresponding to the first image displayed on the first surface of the image display unit to fall on the image combining element from an observation-side surface thereof, and
    the second optical system includes a second reflection element which reflects the second image light corresponding to the second image displayed on the second surface of the image display unit to enter the image combining element from a surface thereof opposite to the observation side.

4. The display device according to claim 3, wherein:
    the first image light and the second image light are linearly polarized in first and second polarization planes orthogonal to each other to exit from the first and second surfaces of the image display unit, respectively,
    the image combining element comprises a reflection polarizing plate having a transmission axis and a reflection axis in directions orthogonal to each other on a plane parallel to a plate surface, and having optical characteristics of transmitting a linearly polarized light component parallel to the transmission axis and reflecting a linearly polarized light component parallel to the reflection axis with respect to two linearly polarized light components orthogonal to each other in an incident light, and
    the reflection polarizing plate reflects the first image light incident from the first optical system and transmits the second image light incident from the second optical system therethrough.

5. The display device according to claim 1, wherein the image combining element comprises a half mirror which reflects the first image light incident from the first optical system and transmits the second image light incident from the second optical system therethrough.

6. The display device according to claim 1, wherein:
    the image combining element is arranged in parallel with the image display unit on a side in a lateral direction as seen from the observation side,
    the first optical system includes a first reflection element which is arranged on the observation side of the image display unit and the image combining element, and reflects the first image light displayed on the first surface of the image display unit to fall on the image combining element from an observation-side surface thereof, and
    the second optical system includes a second reflection element which is arranged on a rear surface side opposite to the observation side of the image display unit and the image combining element, and reflects the second image light displayed on the second surface of the image display unit to enter the image combining element from the rear surface side thereof.

7. The display device according to claim 1, wherein:
    the image combining element is arranged in parallel with the image display unit at a lower part in a vertical direction as seen from an observation side,
    the first optical system includes a first reflection element which is arranged on an observation side of the image display unit and the image combining element and reflects the first image light displayed on the first surface of the image display unit to fall on the image combining element from the observation-side surface thereof, and
    the second optical system includes a second reflection element which is arranged on a rear surface side opposite to the observation side of the image display unit and the image combining element and reflects the second image light displayed on the second surface of the image display unit to enter the image combining element from the rear surface side thereof.

8. The display device according to claim 1, wherein the image display unit displays first and second images having different brightness levels, and image combining element combines the first and second images to form a three-dimensional image.

9. The display device according to claim 1, wherein:
    the first and second comprise a right-eye image and a left-eye image displayed on first surface and the second surface of the image display unit, respectively, the image combining element guides the first and second image lights to exit in different directions, such that the right-eye image of the first and second images exits in a direction of a right eye of an observe and the left-eye image of the first and second images exits in a direction of a left eye of the observer.

10. The display device according to claim 1, wherein:
the image combining element is arranged in parallel with the image display unit on a side in a vertical direction as seen from an observation side,
the first optical system includes a first reflection element which is arranged on the observation side of the image display unit and the image combining element and reflects the first image light displayed on the first surface of the image display unit to fall on the image combining element from the observation-side surface thereof,
the second optical system includes a second reflection element which is arranged on a rear surface side opposite to the observation side of the image display unit and the image combining element and reflects the second image light displayed on the second surface of the image display unit to enter the image combining element from the rear surface side thereof, and
at least one of the first optical system and the second optical system is arranged to be inclined with respect to the image display unit and the image combining element.

11. The display device according to claim 1, wherein:
the first optical system includes a first reflection element which is arranged substantially in parallel with the image display unit on an observation side of the image display unit and the image combining element and reflects the first image light displayed on the first surface of the image display unit to fall on the image combining element from an observation-side surface thereof,
the second optical system includes a second reflection element which is arranged substantially in parallel with the image display unit on a rear surface side opposite to the observation side of the image display unit and the image combining element and reflects the second image light displayed on the second surface of the image display unit to enter the image combining element from the rear surface side thereof, and
the image combining element is inclined with respect to the image display unit and arranged on a side in the vertical direction as seen from the observation side.

12. A display device comprising:
an image display element which controls transmission of light to alternately display different first and second images on a first surface and a second surface thereof, respectively;
two surface light sources which are respectively arranged on both sides of the image display element, which irradiate the display element with illumination lights, and which emit first and second image lights, that respectively correspond to the first and second images and that are transmitted through and exit from the image display element, therethrough in respective directions inclined to a normal line of the image display element by a predetermined angle;
a first optical system which leads the first image light that corresponds to the first image displayed on the first surface of the image display element, and that is emitted in one of the respective directions inclined to the normal line of the image display element by the predetermined angle;
a second optical system which leads the second image light that corresponds to the second image displayed on the second surface of the image display element, and that is emitted in another one of the respective directions inclined to the normal line of the image display element by the predetermined angle;
an image combining element on which the first and second image lights led by the first optical system and the second optical system are alternately incident, and which emits combined image light for displaying a combined image formed by combining the first and second image lights to an observation side;
a display drive circuit which drives the image display element to alternately display the first and second images, that are combined by the image combining element; and
a light source control circuit which controls lighting of the two surface light sources in accordance with display of the first and second images on the image display element.

13. The display device according to claim 12, wherein:
the first and second images are substantially the same, and the display drive circuit controls the image display element to display the first and second images at different brightness levels,
the light source control circuit alternately turns on the two surface light sources arranged on both sides of the image display element in accordance with display of the first and second images so that the first and second image lights alternately exit to the first and second surfaces of the image display element, respectively, and
the image combining element combines the first and second images lights to form a three-dimensional image.

14. The display device according to claim 12, wherein:
the first and second images comprise right-eye image and a left-eye image, respectively,
the light source control circuit alternately turns on the two surface light sources arranged on the both sides of the image display element in accordance with display of the first and second images so that the first and second image lights corresponding to the first and second images alternately exit to the first and second surfaces of the image display element, respectively, and
the image combining element controls the first and second image lights to exit in different directions, such that the right-eye image of the first and second images exits in a direction of a right eye of an observer and the left-eye image of the first and second images exits in a direction of a left eye of the observer.

15. The display device according to claim 12, wherein:
the first optical system includes a first reflection element which reflects the first image light corresponding to the first image displayed on the first surface of the image display element to fall on the image combining element from an observation-side surface thereof, and
the second optical system includes a second reflection element which reflects the second image light corresponding to the second image displayed on the second surface of the image display unit to enter the image combining element from a surface thereof opposite to the observation side.

16. The display device according to claim 12, wherein:
the first image light and the second image light are linearly polarized in first and second polarization planes orthogonal to each other and exit from the first and second surfaces of the image display element, respectively,
the image combining element comprises a reflection polarizing plate having a transmission axis and a reflection axis in two directions orthogonal to each other on a plane parallel to a plate surface, and having optical characteristics of transmitting a linearly polarized light component parallel to the transmission axis and reflecting a linearly polarized light component parallel to the reflection axis with respect to two linearly polarized light components orthogonal to each other in an incident light, and the reflection polarizing plate reflects the first image light incident from the first optical system and transmits the second image light incident from the second optical system.

17. The display device according to claim 12, wherein:

the image combining element is arranged in parallel with the image display element on a side in a vertical direction as seen from the observation side, the first optical system includes a first reflection element which is arranged on the observation side of the image display element and the image combining element and reflects the first image light corresponding to the first image displayed on the first surface of the image display element to fall on the image combining element from and observation-side surface thereof, and the second optical system includes a second reflection element which is arranged on a rear surface side opposite to the observation side of the image display element and the image combining element and reflects the second image light corresponding to the second image displayed on the second surface of the image display element to enter the image combining element from the rear surface side thereof.

18. A display device comprising:

image displaying means for alternately displaying different first and second images on a first and second surface thereof, respectively;

first and second surface light source means, respectively arranged on both sides of the image displaying means, for irradiating the image displaying means with illumination lights, and for emitting first and second image lights, that respectively correspond to the first and second images and that are transmitted through and exit from the image displaying means, therethrough in respective directions inclined to a normal line of the image displaying means by a predetermined angle;

first optical means for emitting the first image light which corresponds to the first image displayed on the first surface of the image displaying means and which is transmitted through and exits from the image displaying means in a first direction inclined to the normal line of the image displaying means by the predetermined angle;

second optical means for emitting the second image light which corresponds to the second image displayed on the second surface of the image displaying means and which is transmitted through and exits from the image displaying means in a second direction inclined to the normal line of the image displaying means by the predetermined angle;

image combining means, on which the first and second image lights emitted by the first optical means and the second optical means are alternately incident, for coinciding first and second light paths of the first and second image lights, and for emitting combined image light of a combined image formed by combining the first and second image lights to an observation side;

display driving means for driving the image displaying means to alternately display the first and second images, which are combined by the image combining means; and light source controlling means for controlling lighting of the first and second surface light source means in accordance with display of the first and second images by the image displaying means.

19. The display device according to claim 18, wherein:

the first image light and the second image light are linearly polarized in first and second polarization planes orthogonal to each other and alternately exit from the first and second surfaces of the image displaying means, respectively, the first optical means includes first reflecting means, arranged on the observation side of the image displaying means and the image combining means, for reflecting the first image light exiting from the first surface of the image displaying means to fall on the image combining means from an observation-side surface thereof, the second optical means includes second reflecting means, arranged on a rear surface side opposite to the observation side of the image displaying means and the image combining means, for reflecting the second image light displayed on the second surface of the image displaying means to enter the image combining means from a rear surface side thereof, and the image combining means comprises a reflection polarizing plate which is aligned and arranged in parallel with the image displaying means on a side in a vertical direction as seen from the observation side, and which has a transmission axis and a reflection axis in two directions orthogonal to each other on a plane parallel to a plate surface, and optical characteristics of transmitting a linearly polarized light component parallel to the transmission axis and reflecting a linearly polarized light component parallel to the reflection axis with respect to two linearly polarized light components orthogonal to each other in an incident light, and the reflection polarizing plate reflects the first image light incident from the first optical means and transmits the second image light incident from the second optical means therethrough.

20. A display device comprising:

an image display unit having a first surface for emitting first image light, and a second surface for emitting second image light;

a first optical system which leads the first image light emitted from the first surface of the image display unit;

a second optical system which leads the second image light emitted from the second surface of the image display unit; and an image combining element on which the first and second image lights led by the first optical system and the second optical system are incident from different sides thereof, and which emits the first and second image lights from one side of said different sides, wherein the image display unit includes:

a transmission type display element which controls transmission of light;

a first surface light source which includes said second surface, and which emits light into the display element so that the first image light is emitted toward the first optical system from the first surface in a direction inclined to a normal line of the display element by a predetermined angle; and a second surface light source which includes said first surface, and which emits light into the display element so that the second image light is emitted toward the second optical system from the second surface in a direction inclined to the normal line of the display element by a predetermined angle.

21. The display device according to claim 20, wherein the image display unit alternately emits the first and second image lights.

22. The display device according to claim 20, wherein the first and second image lights respectively correspond to different images.

23. The display device according to claim 20, wherein the transmission type display element comprises a liquid crystal display element which includes:
   a liquid crystal panel including a pair of substrates and a liquid crystal layer provided therebetween, and
   a pair of polarizing plates arranged with the liquid crystal panel therebetween.

24. The display device according to claim 23, wherein the image combining element includes a reflection polarizing plate for reflecting the first image light from the first optical system and for transmitting the second image light from the second optical system therethrough.

25. The display device according to claim 20, wherein:
   the first optical system includes a first reflection element which reflects the first image light emitted from the first surface of the image display unit to the image combining element, and
   the second optical system includes a second reflection element which reflects the second image light emitted from the second surface of the image display unit to the image combining element.

26. The display device according to claim 20, wherein the image combining element emits the first and second image lights in a same direction.

27. The display device according to claim 20, wherein the image combining element emits the first and second image lights in different directions from each other.

* * * * *